3,473,888
KZnPO₄ CRYSTAL AND METHOD OF
MAKING SAME
James W. Berry and Archie J. Deutschman, Jr., Tucson,
Ariz., assignors to Owens-Illinois, Inc., a corporation
of Ohio
No Drawing. Filed Dec. 21, 1967, Ser. No. 692,260
Int. Cl. C01b 25/26; B01d 9/00; H01v 7/02
U.S. Cl. 23—105                                      5 Claims

ABSTRACT OF THE DISCLOSURE

A new thermally stable, potassium zinc phosphate compound having desirable piezoelectric properties; and a method for its preparation.

---

There is presently a great demand in the electronics and related industries for thermally stable and yet piezoelectric crystalline materials. This is particularly true in the case of piezoelectric devices such as crystal oscillators, delay lines, transducers, hydrophones, sonar devices, and in ultrasonic generators and detectors.

It is therefore an object of the present invention to provide a novel crystalline piezoelectric material and a method for preparing such material.

Another object is to provide a novel crystalline material that is chemically stable at high temperatures.

A further object is to provide a method of preparing a novel thermally stable, crystalline material which material exhibits desirable piezoelectric properties.

The above and other objects, features and advantages of the present invention will become apparent from the following specification and claims.

In attaining the objects of this invention, the principal features reside in the hydrothermal reaction of tripotassium orthophosphate and zinc oxide to produce the new crystalline compound KZnPO₄.

In our commonly assigned, copending application entitled "Improved Hydrothermal Method of Growing Zinc Oxide Crystals" Ser. No. 692,267, filed Dec. 21, 1967 (assignee Docket No. B–9444) there is disclosed and claimed a method for reducing corrosion during the hydrothermal growth of crystalline zinc oxide in an alkaline medium through the use of tripotassium orthophosphate as a corrosion inhibitor. The present invention is based on the discovery of an unexpected hydrothermal reaction between tripotassium orthophosphate and zinc oxide in an aqueous medium, (with or without a small amount of potassium hydroxide) at elevated temperatures and pressures. Potassium hydroxide enhances the solubility of zinc oxide in the reaction solution and a small amount is often incorporated into the reaction system for this purpose.

"Hydrothermal" is an art recognized term and describes a system wherein water is maintained at elevated temperatures. "Hydrothermal reaction" then refers to a reaction taking place under hydrothermal conditions.

According to the invention, the new compound is prepared by reacting tripotassium orthophosphate (K₃PO₄,) and zinc oxide (ZnO) in a closed, aqueous system at temperatures above about 375° C., and usually about 375° C., to about 425° C. At temperatures below 375° C. the reaction rate becomes impractical, while at higher temperatures (e.g. above 425° C.) the pressures often become excessive while the material strength decreases. Additionally, it has been found that reasonable reaction rates are attained at temperatures about 400° C.

The hydrostatic pressure in the autoclave is, of course, determined by the degree of fill and temperature, and can vary from 1,000 p.s.i.g. or less to 20,000 p.s.i.g. or more. The upper operating pressure limit is determined by the autoclave capability.

This reaction can be conveniently carried out in any high pressure-high temperature autoclave. The apparatus used in the following examples was a tubular micro-vessel reactor constructed of No. 316 stainless steel tubing having a length of 6 inches, an outside diameter of ⁹⁄₁₆ inch, an inside diameter of ³⁄₁₆ inch and a pressure rating of 60,000 p.s.i.g. The two reactor ends were each equipped with a collar, nut and cap producing a metal against metal seal.

The reaction vessel is charged with the appropriate quantities of reactants and water, and brought slowly to temperature. As a matter of convenience, the K₃PO₄ is dissolved in water and charged as an aqueous solution. The zinc oxide is relatively insoluble at room temperature, and is therefore charged to the reactor as a fine powder. This results in a reaction slurry at room temperature. As the temperature is increased, the solubility of the zinc oxide increases and a reaction takes place forming the potassium zinc phosphate compound.

The exact chemical mechanism by which this potassium zinc phosphate compound is formed is not fully understood at present although it is suspected that the following reaction takes place.

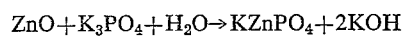

$$ZnO + K_3PO_4 + H_2O \rightarrow KZnPO_4 + 2KOH$$

According to this equation, the presence of KOH in the reaction vessel will tend to suppress the formation of KZnPO₄. It is also known that a small amount of KOH enhances the solubility of ZnO. Accordingly, a small concentration of KOH can be used at the expense of forming less KZnPO₄.

In practicing the present invention, the autoclave is charged with zinc oxide particles. The particle size is not considered to be critical although it is known that the particle size often controls the reaction rate.

After charging the zinc oxide, the reaction vessel is charged with the aqueous hydrothermal solution of 5–75% by weight of K₃PO₄.

It will be understood that the composition of the hydrothermal solution changes slightly due to the dissolution of zinc oxide under hydrothermal equilibrium conditions. This reaction solution in the autoclave comprises the aqueous hydrothermal solution described above plus the amount of dissolved zinc oxide at the operating temperature. The exact solubility of zinc oxide in the hydrothermal solution is not known. The amount of zinc oxide charged to the autoclave is in the range of 0.05–0.3 gram ZnO/gram hydrothermal solution.

The reaction time period employed depends upon the size of the crystal desired. In ordinary applications, this time period can be up to 15 days or longer.

In the following examples the zinc oxide was 99.1% pure, and in powder form.

The concentration of the tripotassium orthophosphate is critical in that if this concentration is too low or too high, the relation product will not be $KZnPO_4$.

To obtain a practical reaction rate, it is necessary to charge the autoclave at room temperature to at least about 50% of the total volume. As the degree of fill increases, the reaction rate usually increases. It is often convenient to operate in the range of 70–90% of autoclave capacity (when measured at room temperature).

After the autoclave has been charged with the zinc oxide and the hydrothermal solutions, the system is slowly brought to operating conditions.

The formation of crystalline $KZnPO_4$ according to the present invention is illustrated in the following examples.

EXAMPLE 1

The micro-autoclave described above was charged with 0.2 gram of zinc oxide and 3.55 grams of a 70% aqueous solution of $K_3PO_4$. The autoclave was then sealed and placed in an oven at 400° C. for 3 days. The pressure was the autogeneous pressure corresponding to the equilibrium conditions and no direct measurement was made. This pressure was estimated to be between 1,000 and 20,000 p.s.i.g.; and probably between 5,000 and 10,000 p.s.i.g.

After this time period the reactor was removed from the oven, opened and about 0.1–0.2 gram of colorless hexagonal crystals having the chemical formula $KZnPO_4$ were obtained.

Analysis of all elements in the compound detected by a semi-quantitative spectrographic analysis in amounts greater than 0.5% were as follows:

| | Percent by weight |
|---|---|
| K | 18.2 |
| Zn | 33.0 |
| P | 15.5 | or as oxides:

| | Percent by weight |
|---|---|
| $K_2O$ | 22.0 |
| ZnO | 41.5 |
| $PO_4$ | 35.5 |

The analysis of potassium and zinc was by mass spectrometry techniques whereas the phosphorus was analyzed by standard wet chemical methods. The zinc analysis were confirmed by X-ray fluorescent analysis while the potassium analysis was confirmed by flame photometry.

A high-temperature heat treatment showed that this crystalline compound is stable in an air atmosphere under normal barometric pressure for at least ½ hour at about 1200° C. This thermal stability is quite unexpected for a phosphate compound.

The density was 3.24 gm./cm.³ as measured by the floatation method.

Powder X-ray diffraction data were obtained for $KZnPO_4$ using a Guinier-De Wolff camera and Cu-radiation. KCl was used as the internal standard. The three strongest diffraction maxima are (222) at 3.107, (411) at 3.186, and (600) at 2.623 A. d-values.

The system crystal properties are set forth below:

Crystal system: Hexagonal (Z=6)
Lattice constants:
  a=18.200±0.003 A.
  b=8.523±0.003 A.
Space group=$P6_3$
Density (calculated from crystallographic data)=3.12 g./m.³

X-RAY POWDER DIFFRACTION DATA $KZnPO_4$

| (1) Observed d | (2) Calculated d | (3) I | h | k | l |
|---|---|---|---|---|---|
| 6.228 | 6.221 | W–M | 1 | 1 | 1 |
| 4.549 | 4.550 | W–M | 2 | 2 | 0 |
| 4.261 | 4.262 | M | 0 | 0 | 2 |
| 4.012 | 4.014 | M | 2 | 2 | 1 |
| 3.307 | 3.310 | vW | 3 | 0 | 2 |
| 3.186 | 3.190 | MS | 4 | 1 | 1 |
| 3.107 | 3.110 | vS | 2 | 2 | 2 |

X-RAY POWDER DIFFRACTION DATA $KZnPO_4$

| (1) Observed d | (2) Calculated d | (3) I | h | k | l |
|---|---|---|---|---|---|
| 2.974 | 2.979 | vvW | 4 | 2 | 0 |
| 2.853 | 2.858 | vvW | 3 | 3 | 1 |
| 2.827 | 2.831 | vvW | 5 | 1 | 0 |
| 2.708 | 2.712 | W | 1 | 1 | 3 |
| 2.623 | 2.627 | S | 6 | 0 | 0 |
| 2.506 | 2.510 | W | 6 | 0 | 1 |
| 2.466 | 2.471 | vW | 3 | 3 | 2 |
| 2.416 | 2.420 | W | 5 | 2 | 1 |
| 2.407 | 2.410 | W | 2 | 2 | 3 |
|  | 2.404 |  | 6 | 1 | 0 |
| 2.231 | 2.236 | vW | 6 | 0 | 2 |
|  | 2.234 |  | 3 | 0 | 3 |
| 2.194 | 2.198 | W | 4 | 4 | 1 |
| 2.186 | 2.190 | W | 4 | 1 | 3 |
| 2.127 | 2.131 | W | 0 | 0 | 4 |
| 2.071 | 2.074 | W | 3 | 3 | 3 |
| 2.004 | 2.007 | W | 3 | 4 | 2 |
| 1.971 | 1.975 | vW | 3 | 0 | 4 |
| 1.926 | 1.929 | W | 6 | 0 | 3 |
| 1.883 | 1.887 | W–M | 5 | 2 | 3 |
| 1.871 | 1.874 | vvW | 4 | 0 | 4 |
| 1.775 | 1.780 | W | 5 | 0 | 5 |
| 1.772 | 1.776 | W | 4 | 4 | 3 |
| 1.739 | 1.744 | vvW | 3 | 3 | 4 |
| 1.729 | 1.733 | vvW | 4 | 2 | 4 |
| 1.716 | 1.720 | vW | 8 | 2 | 0 |
|  | 1.715 |  | 9 | 0 | 1 |
| 1.680 | 1.682 | M | 7 | 1 | 3 |
| 1.672 | 1.675 | vvW | 1 | 1 | 5 |
| 1.651 | 1.655 | vW | 6 | 0 | 4 |
| 1.624 | 1.628 | vvW | 6 | 3 | 3 |
| 1.623 | 1.622 | vvW | 6 | 5 | 1 |
|  |  |  | 9 | 1 | 0 |
| 1.614 | 1.619 | vW | 8 | 0 | 3 |
| 1.592 | 1.594 | M | 7 | 2 | 3 |
| 1.552 | 1.555 | vvW | 4 | 4 | 4 |
| 1.524 | 1.526 | M | 7 | 4 | 2 |
| 1.513 | 1.517 | M | 6 | 6 | 0 |

[1] Calculated from the measured degree 2-theta values using the Cu-radiation wavelength of 1.5405 A.
[2] Calculated from the lattice constants (a=18.200 A. and c=8.523 A.) using λ=1.5405 A.
[3] S=strong, M=medium, W=weak, v=very.

To demonstrate the utility of $KZnPO_4$ as a piezoelectric material some of the crystals produced in Example 1 were employed in a Giebe and Scheibe crystal oscillator. The Giebe and Scheibe type crystal oscillators are well known in the art [for instance, see chapter IV of the text book—"Piezoelectric Crystals and Ultrasonics" by Warren P. Mason, D. Van Nostrand Company Inc., New York, New York (1950)].

It is well known that in the piezoelectric oscillator circuit, the piezoelectric crystal acts fundamentally as a resonator. The crystal does not generate energy although the electrical reaction of its vibrations does determine the alternating potential on the grid of the oscillator and controls it over a narrow frequency range.

The Giebe and Scheibe oscillator demonstrated a definite piezoelectric response in the vicinity of 5.5 mc. Crystal oscillators of this type are, of course, used in the communication field as constant frequency oscillators in controlling the frequency of transmitting, monitoring and receiving circuits.

EXAMPLE 2

The technique and reactants described in Example 1 were used except that 0.37 gram of zinc oxide were used instead of 0.2 gram and the reaction period was 2 days rather than 3 days.

About 0.1–0.2 gram of $KZnPO_4$ were obtained. The chemical and physical properties were similar to those described in Example 1.

From the foregoing, it is apparent that a new piezoelectric compound useful in crystal oscillators, and a method for forming this compound, is provided by the present invention.

Having thus described the invention, what is claimed is:
1. A method for forming the compound $KZnPO_4$ comprising the steps of:
   intimately contacting zinc oxide with an aqueous solution of $K_3PO_4$ in a sealed pressure vessel while maintaining said aqueous solution at a temperature above about 375° C. for a time sufficient to form said compound, said aqueous solution comprising about 5 to about 75% by weight of $K_3PO_4$.

2. The method of claim 1 wherein said temperature is in the range of about 375° C. to about 425° C.

3. The method of claim 2 wherein the amount of zinc oxide is in the range of about 0.05 to .3 gram zinc oxide per gram of said aqueous solution.

4. The method for forming the compound $KZnPO_4$ comprising the steps of intimately contacting zinc oxide with an aqueous solution of $K_3PO_4$ in a sealed pressure vessel while maintaining said aqueous solution at a temperature of about 400° C. for a time sufficient to form said compound, said aqueous solution of $K_3PO_4$ having a concentration of about 70% by weight $K_3PO_4$, said zinc oxide being present in an amount of about 0.05 to .3 gram zinc oxide per gram of said aqueous solution.

5. A $KZnPO_4$ crystal having piezoelectric properties.

References Cited

M. L. Salutsky et al.; Properties of Fertilizer Materials—Metal Potassium Phosphates; J. of Agricultural and Food Chemistry, vol. 12, No. 6, November-December 1964, pp. 486–491.

OSCAR R. VERTIZ, Primary Examiner

H. S. MILLER, Assistant Examiner

U.S. Cl. X.R.

23—184